Oct. 2, 1928.
G. B. GALLASCH
1,686,318
GAUGE
Filed Sept. 4, 1925  3 Sheets-Sheet 1
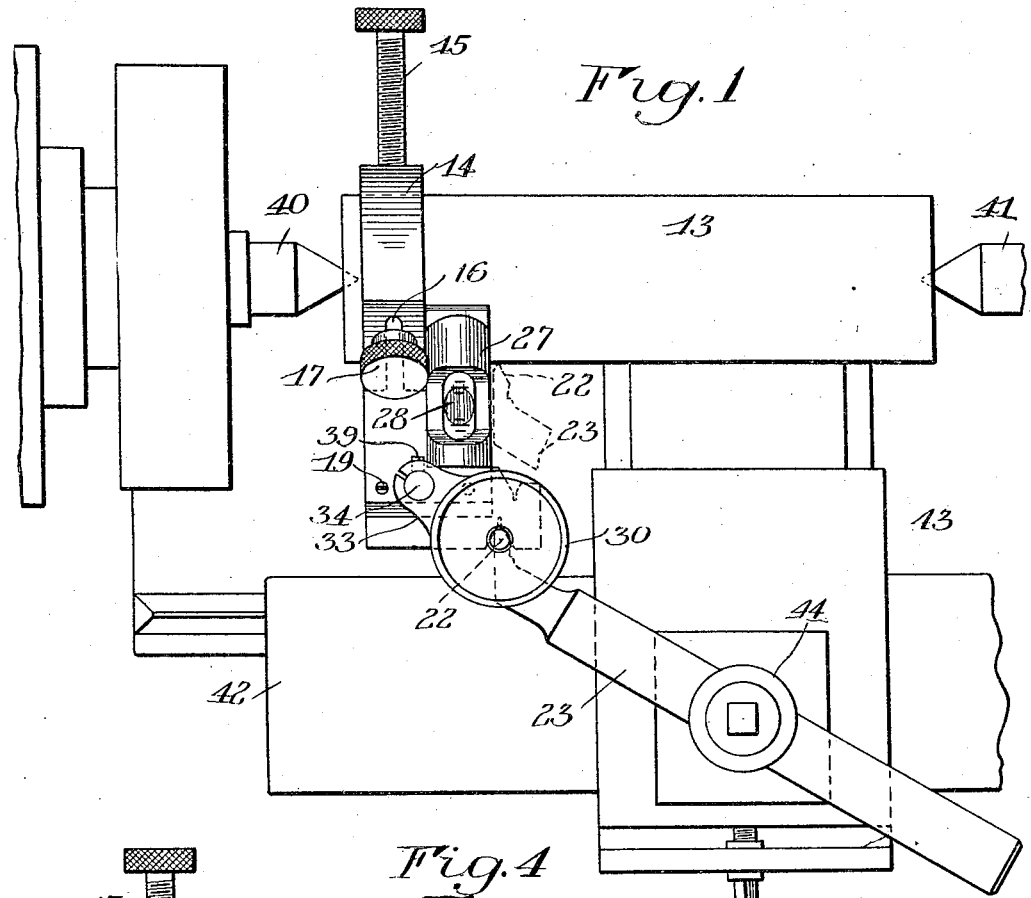
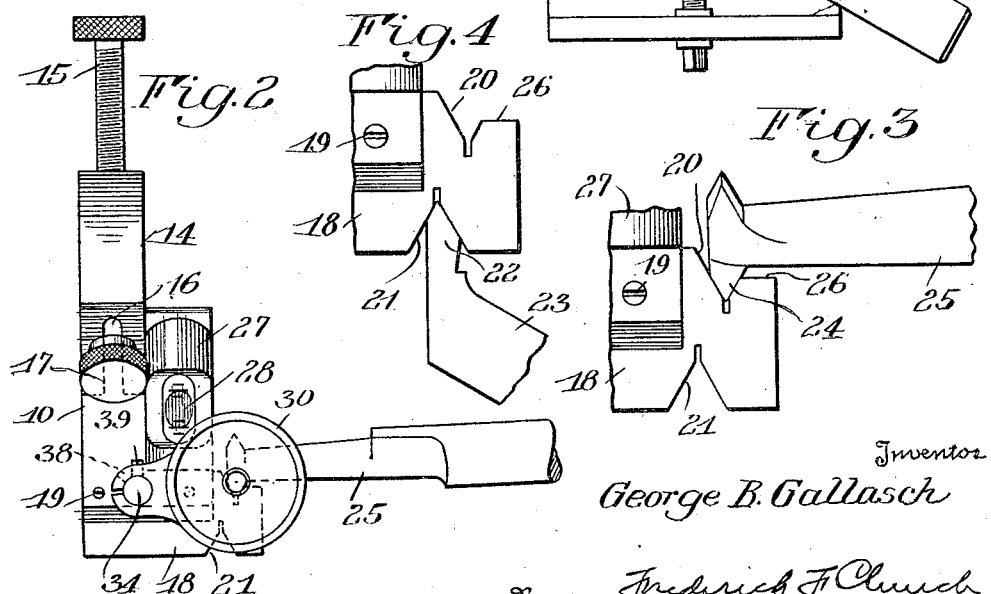
Inventor
George B. Gallasch
By Frederick F. Church
his Attorney Oct. 2, 1928.
G. B. GALLASCH
1,686,318
GAUGE
Filed Sept. 4, 1925   3 Sheets-Sheet 2
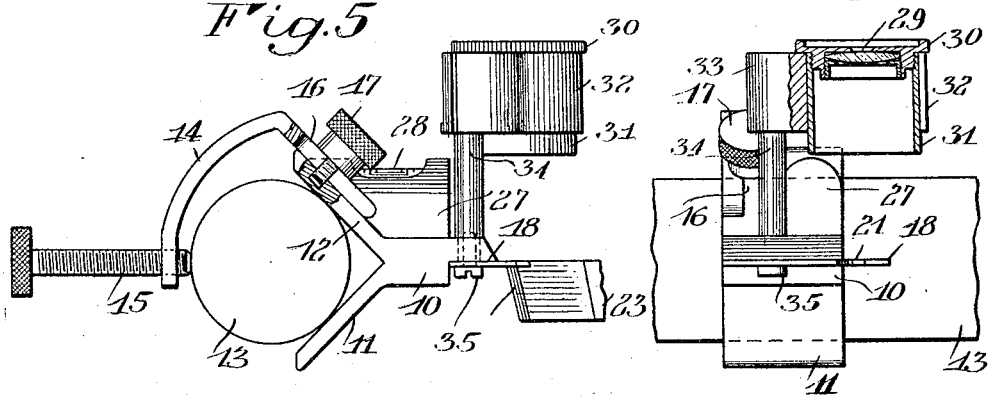
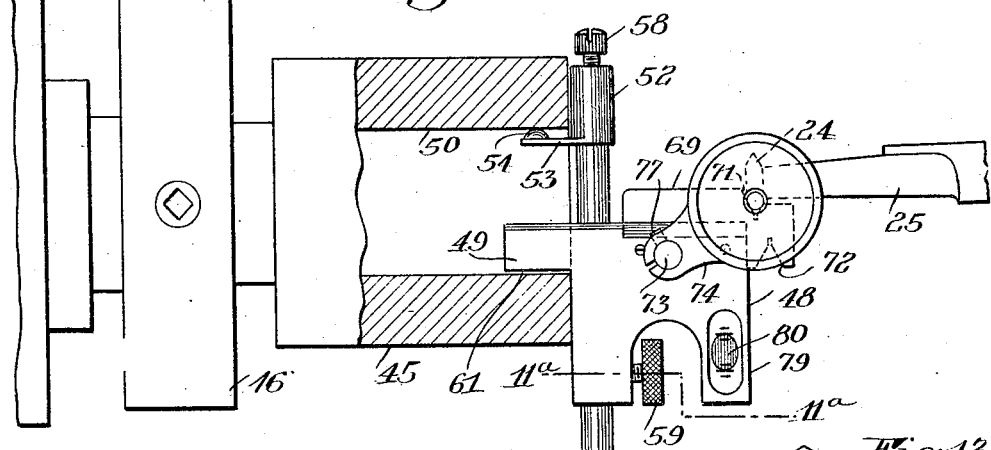
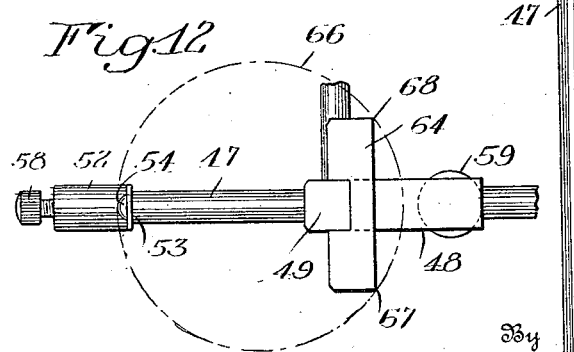
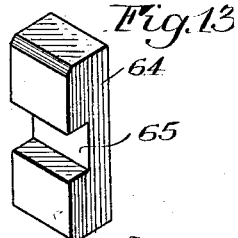
Inventor
George B. Gallasch
By Frederick F. Church
his Attorney

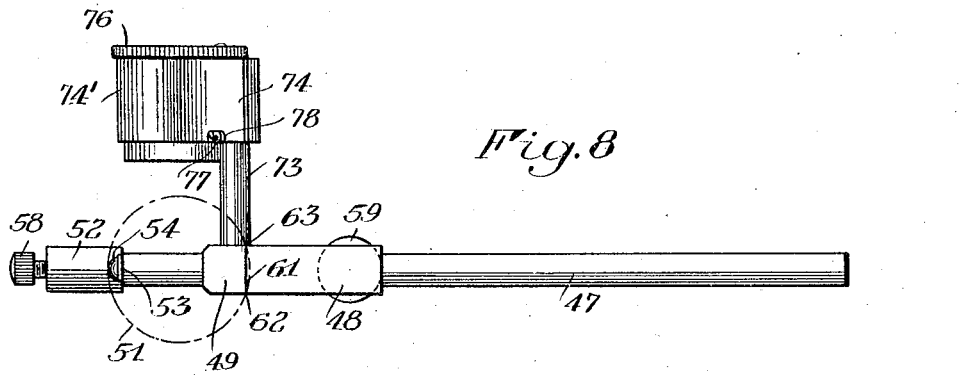
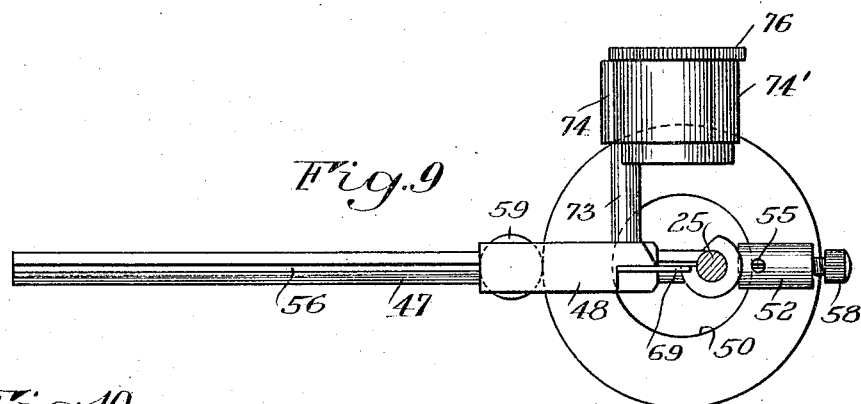
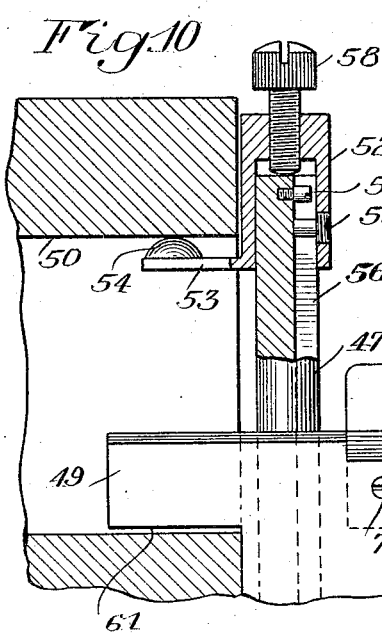
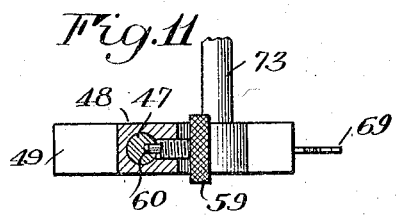

Patented Oct. 2, 1928.

1,686,318

UNITED STATES PATENT OFFICE.

GEORGE B. GALLASCH, OF ROCHESTER, NEW YORK, ASSIGNOR TO BAUSCH & LOMB OPTICAL COMPANY, OF ROCHESTER, NEW YORK, A CORPORATION OF NEW YORK.

GAUGE.

Application filed September 4, 1925. Serial No. 54,399.

This invention relates to gauges and has for its object to provide an improved gauge adapted to serve both as a thread profile gauge and a tool positioning gauge.

A further object of the invention is to provide a thread profile gauge which can be readily clamped upon the work and which includes means for indicating when the gauge is properly adjusted to correctly position the thread-cutting tool with respect to the work.

A further object of the invention is to provide an improved thread profile gauge adapted for use in determining the correct position of the tools for cutting both inside and outside threads.

A further object of the invention is to provide a simple compact detachable form of thread profile gauge for application to various types of work pieces, such as bolts, shafts, tubes and the like and one by which it is possible to determine the proper vertical and angular positions of a tool with respect to the work and also one which embodies an objective for more readily determining whether the profile of the tool coincides with that of the gauge.

To these and other ends the invention resides in certain improvements and combinations of parts all as will be hereinafter more fully described, the novel features being pointed out in the claims at the end of the specification.

In the drawings:

Figure 1, is a plan view illustrating one form of the invention and its application to the work;

Figure 2, is a plan view of the gauge detached from the work, but showing the manner of employing the same in connection with a tool for cutting inside threads;

Figure 3, is a fragmentary plan drawn to an enlarged scale illustrating the application of the profile gauge as employed in connection with an inside thread-cutting tool;

Figure 4, is a similar view illustrating the manner of employing the gauge in the correct positioning of the thread-cutting tool.

Figure 5, is an end elevation of the instrument shown in Figure 2, illustrating its application to a work piece and showing the tool adjusted to the proper height with respect to the gauge;

Figure 6, is a side elevation at right angles to that shown in Figure 5 with the objective shown in section;

Figure 7, is a part sectional plan embodying the application of a modified form of the invention;

Figure 8, is a view in elevation of the instrument shown in Figure 7, as viewed from the left thereof;

Figure 9, is a view similar to Figure 8, looking at the opposite side of the instrument and showing the tool in adjusted position upon the gauge;

Figure 10, is an enlarged fragmentary plan somewhat similar to Figure 7 with certain parts shown in section;

Figure 11, is a fragmentary sectional elevation taken on line 11$^a$—11$^a$ of Figure 7;

Figure 12, is a fragmentary elevation illustrating the use of an attachment for the instrument shown in Figure 8 adapted for accommodating it to relatively large size work pieces; and Figure 13, is a perspective view of the attachment shown in Figure 12.

Similar reference numerals throughout the several views indicate the same parts.

Heretofore there has been no satisfactory method of determining the plane of operation and correct profile of a thread-cutting tool or its angle with respect to the work. The present invention has been designed to afford convenient and accurate means for indicating when the cutting point of the tool is centrally located with respect to the axis of the shaft or bar to be cut and when the profile of the tool corresponds to that of a standard thread as well as when the tool itself is held at the proper angle relative to the work, or in other words when a line bisecting the nose of the cutter is at right angles to the axis of the screw. The life and interchangeability of the threads of manufactured parts depends largely upon the accuracy of the methods employed in cutting the threads. It is well known that threaded parts not having accurately matched threads soon become loose, particularly in machines, where the screw holding parts are subjected to considerable strain under excessive vibration as in the case of automobiles and other motor driven machines.

To satisfy the need for improved means for overcoming the objections pointed out above I have provided satisfactory means for accomplishing the results desired in the form of the invention shown and described herein.

Referring to the drawings I have shown in Figures 1 to 6 inclusive, one form of the invention embodying a V-shaped frame or bracket 10, the legs 11 and 12 of which are adapted to receive a work piece 13 as best shown in Figure 5. The bracket is secured upon the work piece by an adjustable arm 14 having a clamping screw 15 for engaging the work at the opposite side from the bracket. The arm 14 is slotted at its inner end as at 16 to receive a clamp screw 17 which is threaded into the leg 12 of the bracket. The slot 16 permits the arm 14 to be adjusted inwardly or outwardly according to the size of the work piece upon which the threads are to be cut.

The bracket 10 is provided with a thread profile plate 18 removably secured to the bracket by means of screws 19, the top face of the plate being disposed in a plane bisecting the angle between the legs 11 and 12 of the bracket so that for all positions of the rod or shaft 13 within the bracket, the upper surface of said plate will lie in said plane. The plate 18 is provided both with inner and outer properly formed thread profile notches 20 and 21, respectively, as shown in Figures 3 and 4. The outer notch 21 is adapted to receive the nose or profiling portion 22 of a tool 23 for cutting outside threads, the correct application of the tool being shown in Figures 1 and 4 and the inside notch 20 being adapted to receive the nose 24 of a tool 25 for cutting internal threads, the correct application of this tool to the gauge being shown in Figures 2 and 3.

The gauge plate 18 is cut away at the outer edge of the notch 20 as indicated at 26 to permit a tool having a relatively short nose to be used as shown in Figure 3.

The bracket 10 is provided with a level 27 by which to determine when the profile plate 18 is accurately adjusted to a horizontal position, this being indicated when the bubble 28 is in the center of the glass as shown in Figure 1.

The magnifying lens 29 is carried by an apertured holder 30 threaded into a sleeve 31 slidably disposed for longitudinal adjustment in a split ring 32 as shown in Figure 6. The ring is carried by an arm 33 pivotally mounted upon a post 34 extending upwardly from the bracket 10 and rigidly secured thereon by a screw 35 as shown in Figure 5. The arm is slotted or recessed at 38 to receive a stop pin 39 projecting laterally from the post into said slot, the latter being of such a length as to limit the swing of the eye piece or objective between the positions indicated in Figures 1 and 2 whereby the optical axis of the objective is readily brought into coincidence with either of two predetermined points lying within and centrally disposed with respect to the notches 20 and 21 of the profile plate. In this connection the only adjustment required for centering the objective over the notches is to swing it from one extreme position to another.

The shaft 13 on which the threads are to be cut may be supported for rotation with respect to the tool in any suitable manner, as in a lathe between the head and tail-stocks thereof, indicated respectively at 40 and 41 in Figure 1, the lathe having a longitudinal slide 42 carrying a transverse slide 43 provided with a slotted tool post 44 in which the tool 23 is adjustably held whereby it may be moved vertically and adjusted angularly with respect to the work as desired.

It will be understood that the notches 20 and 21 are formed to perfectly represent the correct profile of a standard thread which may be one having a 60° angle or any other angle desired, so that when the nose of the tool is inserted within the notch and observed under the magnifying glass as it approaches the position indicated either in Figures 3 or 4 it is possible to determine whether or not it is profiled to conform to the standard profile of the gauge plate shown.

In the operation of the device described above the gauge is clamped upon the work and in any position to which it may be adjusted the top surface of the gauge plate 18 will lie in a plane intersecting the axis of the shaft. The work is then rotated until the bubble 28 is at the center of the glass, thus indicating that the gauge plate is in a horizontal position. The tool is then adjusted so that the top surface of the profiling end thereof is flush with the top surface of the plate whereby to insure that when the tool is moved over into contact with the shaft 13, as indicated by dot and dash line in Figure 1, it will engage the shaft centrally thereof or midway between the top and bottom and will continue to operate in this position while being moved through advancement of the slide 42. As stated above the profile notches of the gauge plate not only determine whether the profile or the cutting portion of the tool is properly formed but also afford means for positively and accurately positioning the tool at the correct angle with respect to the axis of the screw. The gauge above described, as will be understood, may also be used for checking and setting an inside thread-cutting tool, such as, that shown in Figures 2 and 3, where the tool is adapted to operate within a pipe or tubular member. When the tool has been properly adjusted the gauge may be quickly removed by loosening the clamping screw 15, after which the slide 43 is moved to bring the tool into engagement with the work, the slide 42 being employed to advance the tool during the cutting operation.

The modification shown in Figures 7 to 13 inclusive is adapted for use in connection with tubular work pieces, both for those having inside and outside threads, the instrument being supported through engagement of certain of its parts with the inner face of the tube. It is advantageous in cases where the outer diameter of the tube or shaft is unfinished or is not in the form of a true circle or where it is extremely large, being readily adaptable for use with comparatively large tubular sections because of the relatively long arm or rod on which the gauge is slidably mounted.

The application of this form of the invention is clearly indicated in Figure 7, showing a tubular work piece 45 held by a chuck 46. In this modification a rod 47 of any desired length is employed as a track on which is slidably mounted a gauge block 48 having an arm 49 projecting from one corner thereof for engagement with the inner surface 50 of the tube 45, represented by the dot and dash line 51 in Figure 8. The rod is provided at one end with a sleeve 52 having a yieldable arm 53 of spring material arranged to project into the tubular work piece 45 and provided with a bearing portion 54 adapted to contact with the wall of the tube as shown in Figures 7 and 10. The sleeve is prevented from turning upon the rod by a pin 55 projecting into a slot 56 extending preferably the full length of the rod. A pin 57 is disposed in the path of the pin 55 to limit the outward movement of the sleeve whereby to prevent accidental displacement of the same. An adjusting screw 58 is threaded through the end of the sleeve to engage the end of the rod for producing relative movement between the arms 49 and 53 whereby to clamp the instrument in the position shown in Figure 10, it being understood that a rough adjustment is first made by sliding the block 48 until the approximate distance desired between the arms is afforded. When this has been done the block is clamped in position upon the rod by a screw 59, the inner end of which engages a key 60 loosely mounted in the slot 56 and adapted to travel with the block. The arms being inserted within the tube, the screw 58 is adjusted to move the arm 53 outwardly into yielding and clamping engagement with the wall of the tube.

The outer face 61 of the arm 49 is disposed at a right angle to the rod 47 and due to the curvature of the tube said arm will engage the inner face thereof at two points, namely, at the corners of the section, as indicated at 62 and 63 in Figure 8. In this way the center of the rod is made to intersect the axis of the tube no matter in what position the gauge is adjusted.

An adapter 64 is provided, having a slot 65 therein for receiving the arm 49 in cases where the gauge is to be used with relatively large size tubular work pieces as shown in Figure 12. In this figure the circle indicated by the dot and dash line 66 represents the inner diameter of such a tube, the adapter engaging the latter at two points as indicated at 67 and 68. This arrangement, like that shown in Figures 8 and 9, will cause the center of the rod 47 to intersect the center of the tube in whatever position of adjustment the gauge may be placed. In this case the gauge plate, indicated at 69, is secured to the block 48 by screws 70 and is so positioned upon the block that its upper surface will coincide with the horizontal axis of the rod 47 as shown in Figure 9, whereby said upper surface will also lie in a plane intersecting the axis of the tube upon which the instrument is mounted.

The inner and outer tool receiving notches are indicated at 71 and 72 respectively, as best shown in Figure 10, and are accurately formed to correspond to the profile of a standard thread, such as one having a 60° angle.

The slide block 48 carries an upstanding post 73 having an arm 74 terminating in a split ring 74' carrying a longitudinally adjustable eye piece or objective 76 similar to that shown in Figure 6, the arm being adapted to swing upon the post. The swinging movement of the objective is limited by a pin 77 on the post 73 which projects into a slot 78 of the arm, the length of which is such as to provide for a proper centering of the objective over the notches 71 and 72 when the objective is in its extreme positions of adjustment, one of which is shown in Figure 7.

A level 79 is carried by the slide block to indicate, through the position of the bubble 80, when the upper surface of the gauge plate 69 is horizontally disposed in a plane intersecting the axis of the tubular work piece. In this position of the gauge plate the profile of the tool may be checked and its horizontal and angular positions determined in the same manner as explained above in connection with the instrument shown in Figures 1 to 6 inclusive.

I claim as my invention:

1. A gauge comprising a bracket adapted for connection with a shaft or tube, means upon the bracket for determining the proper angle of a thread-cutting tool with respect to the axis of the shaft and means for indicating when said last mentioned means is adjusted to a predetermined position upon the shaft.

2. A gauge comprising a bracket adapted for connection with a shaft or tube, means for determining when the bracket is in a predetermined position upon the shaft and means carried by the bracket for determining the proper angle of a thread-cutting tool with respect to the axis of the shaft.

3. A gauge comprising a bracket adapted for connection with a shaft or tube upon which threads are to be cut, a plate carried by the bracket having a thread profile notch corresponding to the profile of a standard thread and having a surface adapted in any adjusted position of the bracket upon the shaft to lie in a plane intersecting the axis thereof, said notch being adapted to receive the nose of a thread-cutting tool, the correct angle of which with respect to the shaft is determined by adjusting the tool to occupy a predetermined position with respect to said surface.

4. A gauge comprising a bracket having parts for engagement with the inner surface of a tube whereby the bracket is supported by the tube and means upon the bracket for determining the proper angle of a thread-cutting tool with respect to the axis of the tube.

5. A gauge comprising a bracket having parts for engagement with the inner surface of a tube upon which threads are to be cut whereby the bracket is supported by the tube and a plate carried by the bracket having a thread profile notch corresponding to the profile of a standard thread, said plate having a surface adapted in any adjusted position of the bracket to lie in a plane intersecting the axis of the tube, said notch being adapted to receive the nose of the thread-cutting tool, the correct angle of which with respect to the axis of the tube is determined by adjusting the tool to occupy a predetermined position with respect to said plate surface.

6. A gauge comprising a bracket adapted for connection with a shaft or tube, a level carried by the bracket for determining when the latter is in a predetermined position upon the shaft, a plate upon the bracket having a thread profile notch formed therein for receiving a thread-cutting tool whereby to determine when the lattter is in a predetermined position with respect to the shaft and an objective upon the bracket adapted to overlie said profile notch.

7. A gauge comprising a bracket adapted for connection with a shaft or tube, a plate upon the bracket having separate thread profile notches each adapted to receive the nose of a thread-cutting tool for determining when the latter is in either of two predetermined positions with respect to the axis of the tube, and an objective upon the bracket movable to overlie each of said notches.

8. A gauge comprising a bracket adapted for connection with a shaft or tube, a plate upon the bracket having separate thread profile notches, each adapted to receive the nose of a thread-cutting tool for determining when the latter is in either of two predetermined positions with respect to the axis of the tube, an objective adapted to swing upon the bracket to overlie either of said notches and means for limiting the movement of the objective whereby when swung in opposite directions it will register with the respective notches.

9. A gauge comprising a support including relatively adjustable parts arranged to engage opposite portions of a shaft or tube upon which threads are to be cut, whereby to secure the support upon the shaft or tube and means carried by one of the adjustable parts for cooperation with a thread-cutting tool to determine when the latter is adjusted to a predetermined angle with respect to the axis of the tube.

10. A gauge comprising a support including relatively movable parts arranged to engage opposite portions of a shaft or tube upon which threads are to be cut, adjustable means adapted to clamp said relatively movable parts upon shafts or tubes of different diameters and a thread profile notch formed in one of said parts for receiving the nose of a thread-cutting tool to determine when the latter is adjusted to a predetermined angle with respect to the axis of the tube.

11. A gauge comprising a rod, a block adjustable longitudinally upon the rod and having a member adapted to engage the inner face of a tube, an arm carried by the rod adapted to engage the inner face of the tube in spaced relation to said member and means upon the block having a thread profile notch for receiving the nose of a thread-cutting tool to determine when the latter is adjusted to a predetermined position with respect to the tube.

12. A gauge comprising a support having relatively adjustable parts arranged for clamping engagement with opposing surfaces of a shaft or tube on opposite sides of the axis thereof, one of said parts having a tool positioning portion and means upon the support for indicating when said tool positioning portion is adjusted to a horizontal position.

GEORGE B. GALLASCH.